United States Patent [19]

Ochiai

[11] 3,912,337
[45] Oct. 14, 1975

[54] ANTISKID APPARATUS
[75] Inventor: Takeshi Ochiai, Toyota, Japan
[73] Assignee: Toyota Jidosha Kogyo Kabushiki Kaisha, Tokyo, Japan
[22] Filed: June 30, 1972
[21] Appl. No.: 268,076

[30] Foreign Application Priority Data
July 6, 1971  Japan................................. 46-49311

[52] U.S. Cl............................. 303/21 P; 188/181 C
[51] Int. Cl................................................ B60t 8/08
[58] Field of Search............. 188/181 C; 303/20, 21; 317/5; 324/161; 340/53, 263; 180/82 R, 105 E; 307/10 R

[56] References Cited
UNITED STATES PATENTS

| | | | |
|---|---|---|---|
| 3,578,819 | 5/1971 | Atkins............................. | 303/21 BE |
| 3,604,762 | 9/1971 | Ando et al....................... | 303/21 BE |
| 3,652,133 | 3/1972 | Yamazaki........................ | 303/21 CG |
| 3,690,735 | 9/1972 | Arai et al. ....................... | 303/21 P |
| 3,701,569 | 10/1972 | Arai et al. ..................... | 188/181 C X |
| 3,717,384 | 2/1973 | Harned........................... | 303/21 P X |
| 3,768,873 | 10/1973 | Hirzel ............................. | 303/21 BE |

Primary Examiner—Trygve M. Blix
Assistant Examiner—Stephen G. Kunin
Attorney, Agent, or Firm—Toren, McGeady and Stanger

[57] ABSTRACT

In the antiskid apparatus, a brake modulating apparatus reduce the braking effort of a braking system on a wheel of a vehicle when the wheel is about to skid, and a regulator that operates the modulating apparatus adjusts the operation of the modulating apparatus to the coefficient of friction between the wheel and the road surface. In the regulator, a control apparatus responds to the speed of the wheel and actuates the brake modulating apparatus when the wheel decelerates faster than a control gradient and continues actuating the brake modulating apparatus while the velocity is less than a velocity that decreases according to the gradient. A variable gradient establishing apparatus increase the gradient over a time period toward a given gradient level while the modulating apparatus is unactuated and decrease the gradient over a time period when the control apparatus actuates the modulating apparatus. A time delay circuit coupled to the gradient establishing apparatus delays the decrease of the gradient for a given time after the modulating apparatus is actuated.

32 Claims, 11 Drawing Figures

FIG. 1
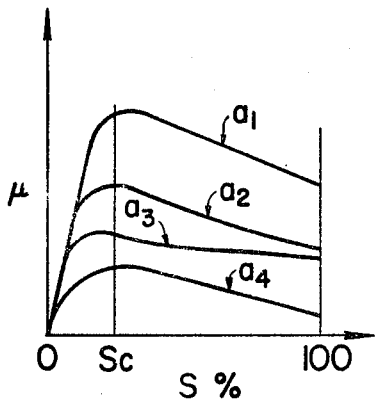
FIG. 2a
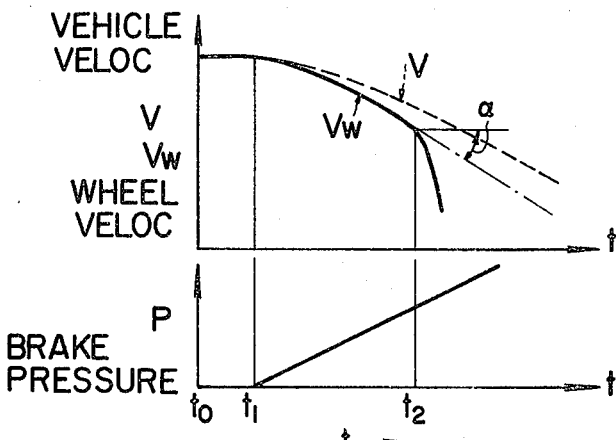
FIG. 2b
FIG. 3
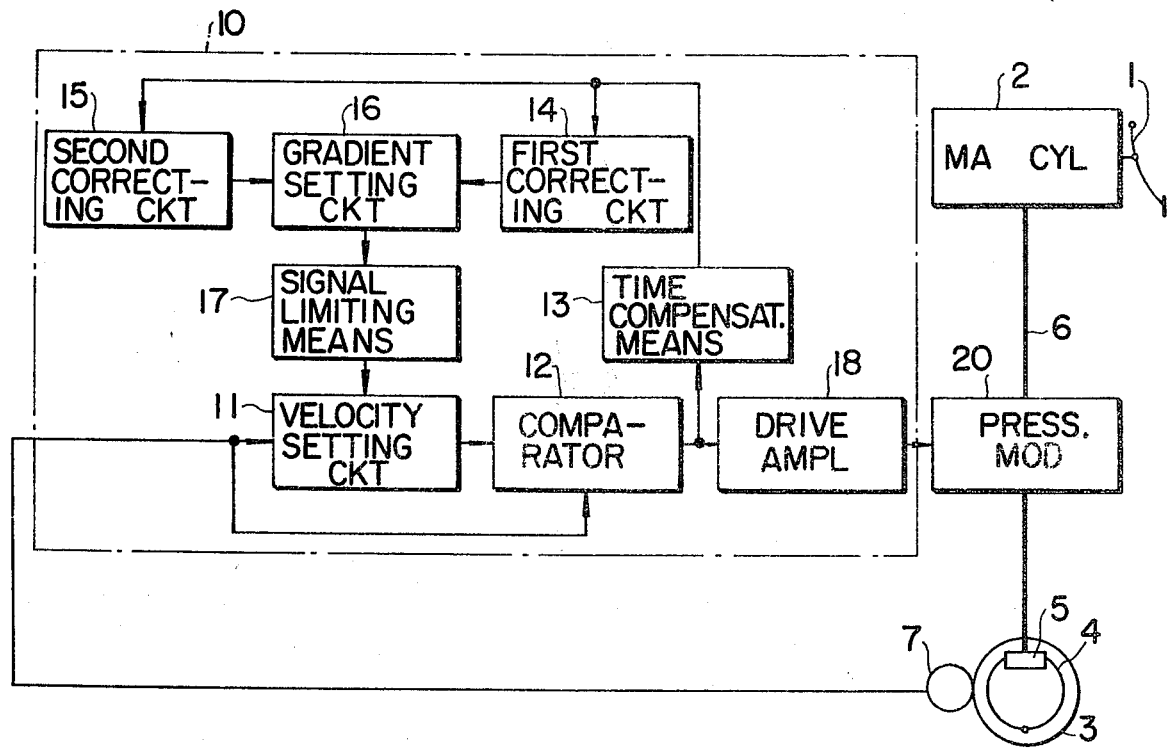

FIG. 6
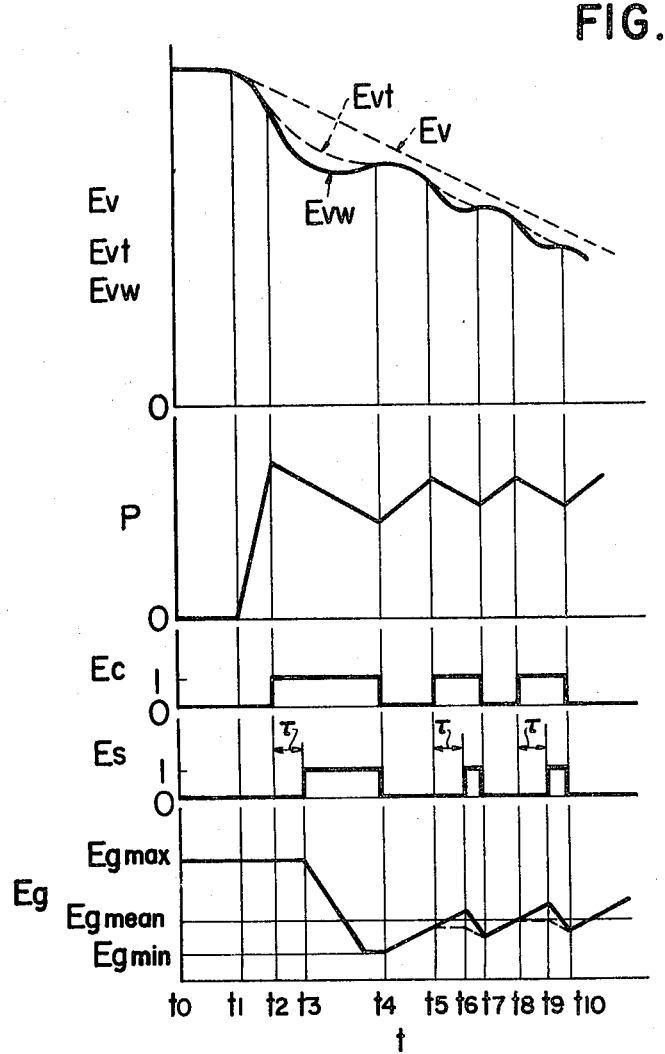
FIG. 6a
FIG. 6b
FIG. 6c
FIG. 6d
FIG. 6e
FIG. 7
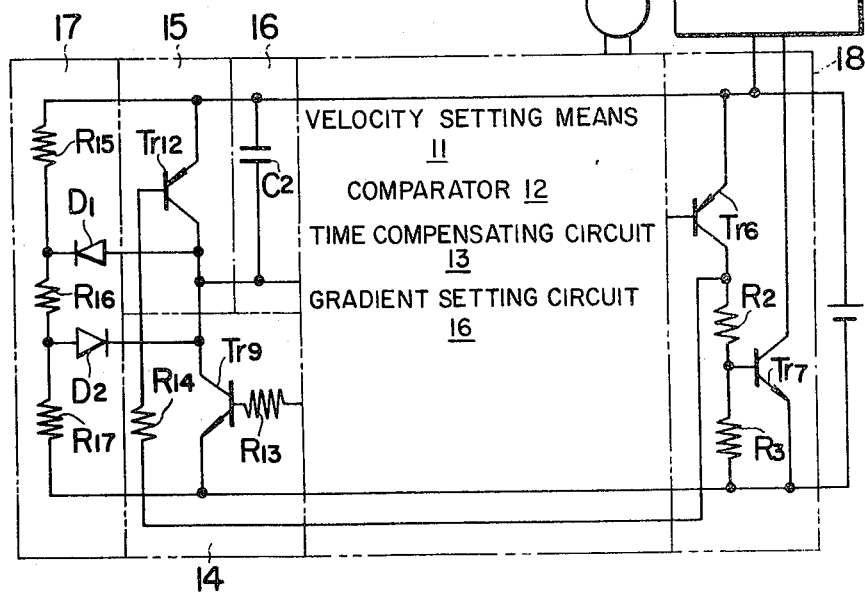

ANTISKID APPARATUS

BACKGROUND OF THE INVENTION

This invention relates to an antiskid apparatus for vehicles such as automobiles, and particularly to antiskid apparatuses which relieve the brake fluid pressure in a wheel cylinder when a brake is applied to prevent loss of control.

Such loss of control can occur during an emergency when the operator "jams" on the brake and decelerates the wheel in excess of the acceleration warranted for the particular road conditions. Under these circumstances the wheel can lock and the vehicle spin out of control. Antiskid devices of the type described must prevent wheel lock while at the same time allow the braking system to stop the vehicle within a minimum distance. To achieve this, the braking system should maintain the maximum coefficient of friction between the wheel and the road surface. It is generally assumed that the maximum coefficient of friction occurs when the slip ratio of a decelerating wheel is in the range of 0.15 to 0.2. Consequently, many antiskid devices constrain the brake system to operate within this range of slip ratios. However, in practice the slip ratio at which the coefficient of friction is maximum varies widely with the kind or condition of road surface, the nature of the tire, or other factors. Therefore, such devices are incapable of ensuring reliable antiskid operation.

An object of the invention is to improve antiskid apparatuses.

Another object of the invention is to provide an antiskid apparatus which effects braking on the basis of the condition of the road surface.

Another object of the invention is to provide an antiskid apparatus which controls the pressure of brake fluid at each wheel and which is not influenced by changes in wheel inertia.

SUMMARY OF THE INVENTION

According to a feature of the invention, control means respond to the velocity of a vehicle's wheel, which a brake system decelerates, and initiate a signal when the wheel decelerates faster than a control gradient and maintains the signal while the wheel velocity is less than a velocity corresponding to the control gradient. Brake modulating means coupled to the control means reduce the braking effectiveness of the system on the wheel in response to the signal and cancel the reduction in the absence of the signal. Variable gradient establishing means coupled to the control means increase the control gradient over a time period toward a maximum control gradient in response to the absence of the signal and decrease the control gradient over a time period during the signal, time delay means coupled to the gradient establishing means delay the decrease of the control gradient for a given time after onset of the signal.

According to another feature of the invention, the control means initiates the signal by comparing the decrease in the output of the wheel velocity detecting means with the discharge rate of a capacitor in the variable gradient establishing means.

According to another feature of the invention, as long as the signal is absent, the discharge rate of the capacitor is increased up to a maximum on the basis of the charging rate of another capacitor in the variable gradient establishing means.

According to another feature of the invention, the variable gradient establishing means decreases the discharge rate of the capacitor during the signal which indicates that the wheel is decelerating faster than the control gradient.

According to yet another feature of the invention, the decrease in the discharge is delayed for a given time after the onset of the signal by means of a third capacitor in the time delay means.

The invention thus determines the required gradient on the basis of the time in which it takes a wheel to recover from excessive deceleration and the time during which the wheel decelerates at the optimum rate, that is when the coefficient of friction is maximum, as the brake fluid pressure in the brake increases or decreases linearly.

The invention is based on the recognition that increasing pressure of brake fluid linearly causes the deceleration of the wheel velocity suddenly to increase, and that the wheel velocity decreases rapidly when the wheel slip ratio exceeds the point where the coefficient of friction is maximum. Thus, it is possible to furnish optimum control by deriving the slip ratio at which the coefficient of friction is maximum from a deceleration of the wheel velocity.

According to another feature of the invention, the velocities of the left and right wheels are detected separately and the brake fluid pressure to the wheels are regulated separately by means of respective wheel velocity detecting means and brake modulating means. Thus, stable antiskid operation can be obtained without concern about changes in the wheel inertia.

According to another feature of the invention, the gradient established by one establishing means can be utilized in another overall control system. This is helpful for simplifying the construction of control systems.

These and other features of the invention are pointed out in the claims. Other objects and advantages of the invention will become apparent from the following description when taken in connection with the accompanying drawings.

BRIEF DESCRIPTION OF THE DRAWINGS

In the drawings:

FIG. 1 is a diagram illustrating the relationship between the wheel slip ratio and the coefficient of friction between a wheel and a road surface;

FIGS. 2a and 2b are graphs illustrating changes in wheel velocity and brake fluid pressure;

FIG. 3 is a block diagram of an antiskid apparatus embodying features of the invention;

FIGS. 6a–6e are respective graphs illustrating signals appearing at various components of the control system of FIGS. 3 and 4;

FIG. 7 is a schematic diagram illustrating a modified control system also embodying features of the invention;

DESCRIPTION OF THE PREFERRED EMBODIMENTS

Figure 4:
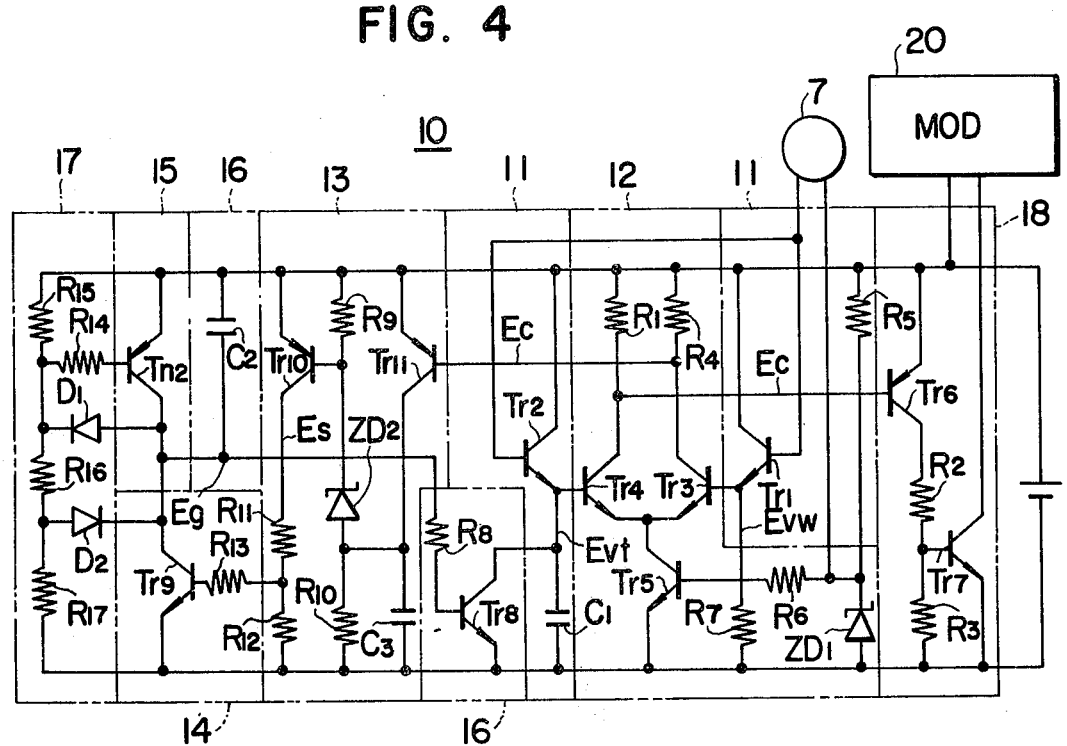
FIG. 4 is a schematic circuit diagram of a control system of the antiskid apparatus shown in FIG. 3.

FIG. 1 illustrates $\mu$-S curves for various road surfaces. The ordinate represents the coefficient of friction and the abscissa represents the wheel slip ratio S in percentages of 0 to 100. It is apparent that all the curves $a_1$ through $a_4$ vary with the condition of the road surface or the vehicle velocity and that the slip ratios on these curves at which the coefficient of friction is maximum differ widely from the wheel slip ratio $S_c$ of the curve $a_1$ having the largest coefficient of friction. Thus, it can be seen that the maximum coefficient of friction depends upon various conditions.

FIGS. 2a and 2b illustrate the relationship between changes in the pressure P applied by a brake system to a wheel cylinder of a wheel on a vehicle and the changes in the wheel velocity Vw and the vehicle velocity V in response to the pressure P of the brake fluid as the latter increases linearly from the time $t_1$. In FIG. 2a the ordinate represents the wheel velocity Vw and the vehicle velocity V. In FIG. 2b the ordinate represents the pressure P of the brake fluid, and the abscissa in both figures the time $t$. As shown in FIGS. 2a and 2b the wheel velocity Vw gradually separates from the vehicle velocity V as the pressure of the brake fluid P increases linearly. This increases the slip ratio. As can also be seen from FIG. 2a, the maximum coefficient of friction is attained at the time $t_2$ and decreases rapidly with increasing deceleration. Consequently, if the deceleration at the time $t_2$ is represented by $\alpha$, and the deceleration is always set at $\alpha$ on the basis of the condition of the road surface and the vehicle velocity, the vehicle is being decelerated ideally because the wheel is engaging the road surface under conditions of maximum coefficient friction.

The antiskid apparatuses embodying this invention detect the occurrence of the time $t_2$, derive a deceleration curve which is corrected to decrease along a gradient corresponding to the deceleration $\alpha$, and control the pressure of the brake fluid so that the wheel velocity coincides with the deceleration curve.

In the antiskid apparatus of FIG. 3, braking of the vehicle is controlled by measuring the wheel velocity of one selected wheel. Here, a pressure modulator 20 intervenes in an oil passage 6 that carries fluid from a master cylinder 2 to a wheel cylinder 5. A brake pedal 1 actuates the master cylinder. The wheel cylinder 5 actuates a brake shoe 4 of a wheel 3. A wheel velocity detector 7 senses the wheel velocity of the wheel 3. A controller 10 responds electrically to the wheel velocity detector and operates the pressure modulator 20.

During normal braking the pressure modulator 20 is not operated. Thus, the brake fluid, pressurized by the master cylinder according to the effort applied by the brake pedal 1, appears unmodified at the wheel cylinder 5. Thus, the brake force applied by the wheel cylinder corresponds to the braking force applied to the brake pedal 1. On the other hand, if the controller 10 determines from the wheel velocity signal derived from the wheel velocity detector that the wheel 3 is likely to become locked when the brakes are applied in an emergency, the controller 10 actuates the pressure modulator 20. The latter then shuts off the brake fluid from the master cylinder 2. In this way the pressure of the wheel cylinder 5 is regulated so that the vehicle can be stopped in a minimum distance without causing the wheels to lock.

In the controller 10, a wheel velocity setting circuit or means 11 responds to the wheel velocity Vw as determined by the detector 7 to derive a deceleration curve Vt lower than the wheel speed Vw. The deceleration curve continuously changes on the basis of the current speed Vw. Comparing means or a comparator 12 compares the value of the actual velocity Vw with the desired velocity of the curve Vt projected by the velocity setting means 11. When the wheel velocity Vw suddenly dips below the curve Vt the comparator 12 constrains a drive amplifier 18 to make the pressure modulator 20 reduce the pressure in the line 6. This reduces the deceleration of the wheel 3.

The deceleration curve Vt decreases at a descent rate determined by a gradient signal $g$ derived from a gradient setting circuit 16. The latter corrects the gradient signal $g$ continuously on the basis of information received from a first correcting circuit 14 and a second correcting circuit 15. When the comparator 12 notifies the second correcting circuit 15 that the wheel velocity Vw has not suddenly dipped below the curve Vt, the circuit 15 raises the gradient signal $g$. On the other hand, when the comparator 12 emits a signal C indicating that the wheel velocity Vw has dropped below the more slowly varying curve Vt, the first correcting circuit 14 reduces the gradient signal $g$. Both the increase and decrease in the gradient signal $g$ is gradual.

Both of the circuits 14 and 15 operate on the basis of the presence and absence of a signal S emitted by a time compensating circuit 13. The latter delays transmission of the signal C, that indicates excessive deceleration of the wheel, for a predetermined time T. That is, the time compensating circuit 13 receives the output signal C from the comparator 12 and corrects tthe gradient signal by waiting a time T after the onset of the signal C and then producing the signal S for the remainder of the appearance of the signal C. In this way, the gradient is continuously corrected.

Details of the controller 10 appear in the FIG. 4. Here the wheel velocity detector 7 applies the voltage appearing at one of its leads to the respective bases of two emitter-follower transistors $Tr_1$ and $Tr_2$. The emitter of the transistor $Tr_1$ is loaded by a resistor $R_7$. Thus, a voltage Evw proportional to the wheel velocity Vw is generated.

The emitter of transistor $Tr_2$ is loaded by a capacitor $C_1$. Thus, the transistor $Tr_2$ forms a voltage Evt representing the deceleration curve Vt across the capacitor $C_1$. The deceleration curve Vt thus depends upon the wheel velocity Vw.

In the comparator 12 two transistors $Tr_3$ and $Tr_4$ receive respective inputs from the emitters of transistors $Tr_1$ and $Tr_2$ and form a differential amplifier with a transistor $Tr_5$ and two collector resistors $R_1$ and $R_4$. In the differential amplifier, the transistor carrying the higher base voltage conducts. Under normal circumstances, when no brake pressure is applied, or when brake pressure is applied slowly, the voltage Evw exceeds the voltage Evt and the transistor $Tr_3$ conducts. This produces a low potential Ec at the resistor $R_4$ and a high potential at the resistor $R_1$. A transistor $Tr_6$ in the drive amplifier 18 is rendered non-conductive by the high potential at the resistor $R_1$ so that the resulting low voltage at the common point between the collector resistors $R_2$ and $R_3$ cuts off a transistor $Tr_7$. This prevents a signal from turning on the pressure modulator 20.

On the other hand, when the wheel velocity drops rapidly enough to drive the voltage Evw down beyond the ability of the voltage Evt across the capacitor $C_1$ to follow, so that Evw is less than Evt, the transistor $Tr_4$ becomes conductive and the transistor $Tr_3$ non-conductive. This turns on transistor $Tr_6$ so as to drive current through the resistors $R_2$ and $R_3$, the latter of which serves as a bias resistor for the base of the transistor $Tr_7$. This turns on the transistor $Tr_7$ so that it actuates the pressure modulator 20. At the same time, the voltage Ec rises.

In the comparator 12 the transistor $Tr_5$ whose collector is connected to the emitters of the transistors $Tr_3$ and $Tr_4$, receives a base biasing voltage through a resistor $R_6$ from the constant voltage point of a constant voltage circuit composed of a Zener diode $ZD_1$ and a resistor $R_5$.

In the time compensating circuit 13 a transistor $Tr_{11}$ responds to the voltage Ec at the collector of the transistor $Tr_3$. When the voltage Ec is low because the brake is not being used or being used only gently, the transistor $Tr_{11}$ conducts and charges the capacitor $C_3$. At the same time the charged capacitor $C_3$ applies a voltage through a biasing network composed of resistors $R_9$ and $R_{10}$ and a Zener diode $ZD_2$ to the base of a transistor $Tr_{10}$. This biasing voltage cuts off the transistor $Tr_{10}$ when the deceleration of the wheel is less than the predetermined gradient.

When the voltage Ec rises as a result of a rapid deceleration so that Evt exceeds Evw, the capacitor $C_3$ begins discharging slowly through the resistor $R_{10}$. After a time T determined by the resistor $R_{10}$ and the capacitor $C_3$, the transistor $Tr_{10}$ begins conducting.

In its non-conducting state when the wheel velocity is not decelerated too rapidly, the transistor $Tr_{10}$ turns off a transistor $Tr_9$ in the first correcting circuit 14 through a collector resistor $R_{11}$ and two biasing resistors $R_{12}$ and $R_{13}$. Under these circumstances a capacitor $C_2$ discharges through a transistor $Tr_{12}$ that is biased into conduction by two resistors $R_{14}$ and $R_{15}$. This produces a high voltage Eg. A diode $D_1$ and two resistors $R_{16}$ and $R_{17}$ form an upper limit to the value Eg by providing a charge path.

When conduction of transistor $Tr_{10}$ turns on the transistor $Tr_9$, the latter charges the capacitor $C_2$ so that the value drops. A diode $D_2$ establishes a lower limits to the drop of the value Eg. The transistor $Tr_{12}$ forms the second correcting circuit while the diodes $D_1$ and $D_2$ as well as resistors $R_{14}$ through $R_{17}$ form the signal limiting circuit 17. The capacitor $C_2$ forms the gradient setting circuit.

The voltage Eg at the capacitor $C_2$ establishes the gradient through a resistor $R_8$ in the gradient setting circuit 16. Here the voltage Eg, when it is high, renders the transistor $Tr_8$ sufficiently conductive to form a shunt across the capacitor $C_1$. The gradient is then steep. The voltage Evw must then drop very rapidly to overcome the shunting effect of the transistor $Tr_8$. That is to say, the lower resistance of the transistor $Tr_8$ forms a comparatively short time constant with the capacitor $C_1$. Therefore, the base of the transistor $Tr_4$ can more readily follow the voltage applied by the transistor $Tr_2$. On the other hand, when the value of the voltage Eg drops, the effective resistance of the transistor $Tr_8$ increases. At its highest resistance the time constant formed by the main path of current flow in the transistor $Tr_8$ and the capacitor $C_1$ is comparatively high. This produces a decreasing gradient. That is to say, the base of transistor $Tr_4$ cannot easily follow rapid drops in the voltage applied to the transistor $Tr_2$.

Figure 5:
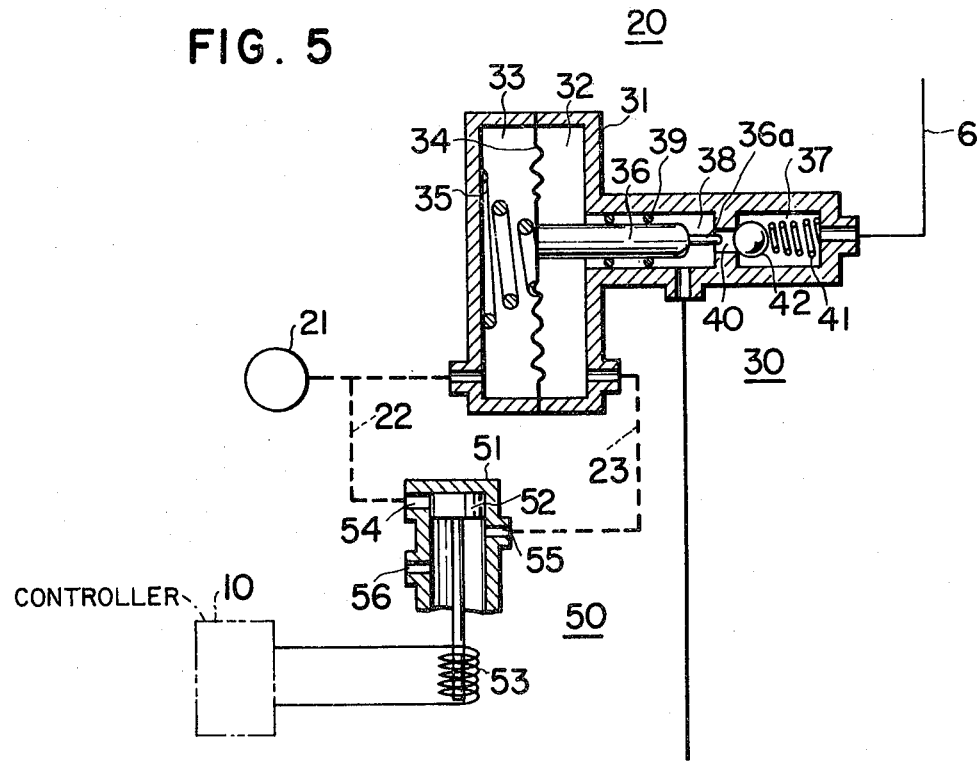
FIG. 5 is a schematic and partly sectional illustration of a pressure modulator used in the apparatus of FIGS. 3 and 4.

The manner in which the currents through the transistor $Tr_7$ of the controller 10 actuates the pressure modulators 20 is shown in FIG. 5. The pressure modulator 20 is composed generally of a pressure modulating portion 30 and a change-over valve 50. In the pressure modulating portion 30, a diaphragm 34 divides the large diameter of a cylinder 31 so as to define an operating chamber 32 and a negative pressure chamber 33. A spring 35 biases a piston 36, which is connected to the diaphragm 34, to the right. An introductory chamber 37 communicates with the master cylinder 2 (see FIG. 3) through the line 6. A modulating chamber 38 communicates with the wheel cylinder 5, also shown in FIG. 3. A seal 39 partitions the modulating chamber 38 from the operating chamber 32. Forming a fluid connection between the modulating chamber 48 and the introductory chamber 39 is a bore 40 through which the tip 36a of the piston 30 moves longitudinally. A spring 41 biases a check ball 42 against the bore 40 so as normally to block passage of fluid between the chambers 37 and 38.

In the change-over valve 50 a cylinder 51 forms an interior passageway for movement of a valve body 52. A spring (not shown) drives the valve body downwardly from the top of the cylinder 51. An electromagnetic coil responds to the output current generated by the transistor $Tr_7$ in the controller 10 by forcing the valve body 52 upwardly against the force of the spring (not shown). As the valve body 52 moves up and down it opens and closes three connecting ports 54, 55, and 56 in the side of the cylinder 51.

The negative pressure chamber 33 of the pressure modulating portion 30 is connected to the port 54 of the change-over valve 50 through a pipe or line 22 emerging from a negative pressure source 21. The operating chamber of the portion 30 is connected to the port 55 by a line 23, while the port 56 is open to the atmosphere.

In operation, when the coil 53 is unenergized by the controller 10, the spring (not shown) pushes the valve body 52 downwardly so that it blocks entry of atmospheric air from the port 56. At the same time, it allows communication between the ports 54 and 55. In this way, the lines 22 and 23 admit the negative pressure to the chamber 32 as well as the chamber 33. Under these circumstances the spring 35 has an opportunity to drive the piston 36 sufficiently far to the right so the tip 36a can unseat the check ball 42 from the bore 40 against the force of the smaller spring 41. By virtue of this arrangement the pressure modulating portion 30 admits the brake fluid from the master cylinder 2 and the brake line 6 through the introductory chamber 37, the bore 40, and the modulating chamber 38 to the wheel cylinder 5. The brake pressure applied by an operator then affects the brake cylinder in proportion to the effort applied by the operator.

When the controller 10 excites the electromagnetic coil 53 the valve body 52 of the change-over valve 50 moves to the position illustrated in FIG. 5. This brings the port 55 into communication with the port 56. Atmospheric pressure thus passes to the operating chamber 32 through the ports 55, 56 and line 23. The atmospheric pressure in the chamber 32 then drives the diaphragm 34 to the left against the negative pressure in the chamber 33 and against the force of the spring 35. The leftward movement of the diaphragm 34 withdraws the piston 36 so that the tip 36a allows the check ball 42 to seat itself in the entrance to the bore 40.

The operation of the embodiment of the antiskid apparatus shown in FIGS. 3, 4, and 5 can be best understood from the pressure and by considering the voltage waveforms in FIGS. 6a, 6b, 6c, 6d, and 6e. FIG. 6a illustrates the relationship between the voltage Evw related to the wheel velocity Vw, the voltage Evt related to the deceleration curve, the voltage Ev related to the imaginary vehicle velocity and the time t. FIG. 6b illustrates the relationship between the pressure P of the brake fluid supply to the wheel cylinder 5 and the time t. FIGS. 6c through 6e show the relationship between the voltages Ec, Eb, Eg at the time t. The reference characters Egmax, Egmean, and Egmin in FIGS. 6e indicate the upper limit, the mean value and the lower limit of the voltage Eg, respectively.

When a vehicle is travelling normally such as between the time $t_0$ and $t_1$, the wheel velocity Vw is equal to the vehicle velocity and is constant. Consequently, in the controller 10, the capacitor $C_1$ is charged until the voltage Evt becomes equal to the voltage Evw and the transistors $Tr_2$, $Tr_4$, and $Tr_6$, as well as transistor $Tr_7$ are rendered non-conductive. On the other hand, transistors $Tr_3$ and $Tr_{11}$ conduct and the capacitor $C_3$ is charged. At the same time, the transistors $Tr_9$ and $Tr_{10}$ are rendered non-conductive and the transistor $Tr_{12}$ discharges the capacitor $C_2$ to maintain the voltage Eg at the maximum voltage Egmax. The voltage Eg renders the transistor $Tr_8$ conductive so that capacitor $C_1$ is discharged. However, when the voltage Evt is decreased the transistor $Tr_2$ conducts and capacitor $C_1$ is charged with a heavy current. Ultimately, the voltage Evt is maintained equal to the voltage Evw. At this point the electromagnetic coil 53 in the pressure modulator 20 is deenergized by the non-conduction of the transistor $Tr_7$.

The inactive coil 53 allows the spring (not shown) in the cylinder 51 to push the valve body 52 downwardly so as to admit the negative pressure at the port 54 into the operating chamber 32 of the pressure modulating portion 30. Thus, the spring 35 moves the diaphragm 34 and the piston 36 to the right. Consequently, the tip 36a of the piston 36 unseats the check ball 42 to open the bore 40. The brake fluid from the master cylinder 2 then flows into the wheel cylinder 5 without being modified and applies the pressure of the brake fluid in accordance with the effort applied to the brake pedal 1.

When an emergency braking effort is applied to the brake pedal 1 at the time $t_1$ to stop the vehicle quickly, the pressure P of the brake fluid is increased as shown in FIG. 6a. This decreases the voltage Evw representing the wheel velocity. This initial decrease is smaller than the voltage drop rate caused by the discharge of capacitor $C_3$ through the transistor $Tr_8$. Thus, the voltage Evt is capable of following the voltage Evw so they are equal and they decrease simultaneously during the period from $t_1$ to $t_2$. The voltages Ec, Es, and Eg remain in the same state they were during the period from $t_0$ to $t_1$. The pressure modulator 20 also remains in the same state.

When the coefficient of friction between the wheel and the road surface attains a maximum at the time $t_2$, the wheel velocity Vw decreases suddenly. Accordingly, in the controller 10, the rate of decrease of the voltage Evw exceeds the gradient set for the voltage Evt by the discharge action of the transistor $Tr_8$. Thus, the voltage Evw falls below the voltage Evt and the transistor $Tr_2$ is driven into a non-conductive state while the transistor $Tr_4$ is rendered conductive. This raises the voltage Ec from the low level that it has maintained between the times $t_0$ and $t_2$ to its high level as shown in FIG. 6c. In this figure, it should be noted that the low level is designated 0 and the high level 1.

A voltage $Ec_1$ appearing at the collector of $Tr_4$ represents the complement or reverse of the signal Ec appearing in FIG. 6c. The voltage $Ec_1$ constitutes the signal which turns on the transistor $Tr_7$ through the transistor $Tr_6$. It thus applies a pressure reducing signal to the pressure modulator 20.

In the pressure modulator 20 excitation of the electromagnetic coil 23 in the change-over valve 50 pushes the valve body 52 against the force of the spring (not shown) into the position shown and admits atmospheric pressure into the operating chamber 32 of the pressure modulating portion 30 through the port 55. In this way, the diaphragm 34 and the piston 36 are moved to the left against the force of the spring 35 and the bore 40 is closed by the check ball 42. This shuts off the flow of brake fluid into the wheel cylinder 5. Simultaneously, the volume of the modulating chamber is increased due to the movement of the piston 36 to the left. Thus, the pressure of the brake fluid of the wheel cylinder 5 is decreased as shown in FIG. 6b after time $t_2$.

The pressure P of the brake fluid continues to decrease until the time $t_4$ as described above, thus allowing the wheel velocity Vw to increase and again approach the vehicle velocity in relation to the coefficient of friction $\mu$ of the road surface. When the wheel velocity is being restored, it is necessary to correct the deceleration curve in accordance with the road surface condition if the wheel velocity is not fully restored to the deceleration curve after a definite time has elapsed. Accordingly, in the controller 10, the transistor $Tr_3$ is driven into non-conduction by conduction of te transistor $Tr_4$. Thus, the transistor $Tr_{11}$ is also driven into non-conduction and the capacitor $C_3$ is discharged by the resistor $R_{10}$. After a definite period of time T, the transistor $Tr_{10}$ is rendered conductive through the Zener diode $ZD_2$ and the voltage Es is generated at the time $t_3$ as shown in FIG. 6d. The voltage Es causes the transistor $Tr_9$ to conduct, thereby charging the capacitor $C_2$. This charging causes the voltage Eg to decrease as shown in FIG. 6e. It also decreases the set gradient of the deceleration curve Vt by rendering the transistor $Tr_8$ across the capacitor $C_1$ less conductive.

When the increasing wheel velocity Vw exceeds the deceleration curve Vt at the time $t_4$, the voltage Evw becomes higher than the voltage Evt. This drives the transistor $Tr_4$ into a non-conductive state so as to raise the voltage $Ec_1$. At the same time, transistor $Tr_3$ is rendered conductive thereby lowering the voltage Ec. The pressure reducing signal to the pressure modulator is thereby eliminated.

At this time, in the pressure modulator, elimination of the pressure reducing signal corresponds to application of a pressure applying signal. The energization of the electromagnetic coil 53 allows the body 52 to cause communication between the ports 54 and 55. The resulting presence of negative pressure in the chamber 32 allows the spring 35 to move the piston 36 to the right where it closes in on the check ball 42. Thus, the volume of the modulating chamber is decreased and the pressure of the brake fluid to the wheel cylinder is increased as shown in FIG. 6b.

When the voltage Ec drops to 0 as described above, the transistor 4 is driven into non-conduction in the controller 10. Simultaneously, the transistors $Tr_3$ and $Tr_{11}$ conduct. As a result, the capacitor $C_3$ charges rapidly to drive the Transistor $Tr_{10}$, and hence the transistor $Tr_9$, into non-conduction and to convert the signal representing the voltage Es to zero. The capacitor $C_2$ discharges through the transistor $Tr_{12}$, thereby raising the value of the voltage Eg.

The diode $D_1$ which is fixed at one side to a voltage in the voltage divider $R_{15}$, $R_{16}$, and $R_{17}$ prevents the capacitor $C_2$ from discharging beyond a predetermined value. It therefore prevents the value Eg from climbing beyond the value Egmax. The diode $D_2$, also tied to a fixed voltage, prevents the capacitor $C_2$ from charging beyond a predetermined value, and therefore prevents the voltage Eg from falling to a value less than Egmin.

When the wheel velocity Vw is decreased again due to the increase in the pressure P of the brake fluid during the time bwtween $t_4$ and $t_5$, the same operating conditions which occurred between the time $t_1$ to $t_2$ prevail. However, as the capacitor $C_2$ is charged in the controller 10, the transistor $Tr_{12}$ discharges the capacitor $C_2$ during the period between the time $T_4$ through the time $T_6$. This corrects the set gradient of te deceleration curve at a fixed rate by increasing the voltage Eg as shown in FIG. 6e by the unbroken line. At the same time, overcorrection is avoided. The voltage Eg is limited by the diode $D_1$ so as not to exceed the voltage Egmax.

When the coefficient of friction $\mu$ again reaches its maximum at the time $t_5$, the voltage Evw of the wheel velocity Vw falls below the voltage Evt. In the controller 10, the pressure reducing signal Ec is again raised and the pressure P of the brake fluid decreased by the pressure modulator. This causes the wheel velocity Vw to be restored.

In a manner similar to that described above, the pressure applying signal appears at the pressure modulator at the times $t_7$ and $t_{10}$ and the pressure applying signal is applied at the time $t_7$. The first correction is performed at the period $t_6$ to $t_7$ and from $t_9$ to $t_{10}$. Also, the second correction is performed during the period from time $t_7$ to time $t_9$ and after the time $t_{10}$. The mean value Egmean of the voltage Eg is obtained by this continuous correction process involving the beforementioned first and second correction. Thus, the gradient of the deceleration curve is adjusted continuously to the condition of the road surface and braking is performed, on the average, at the slip ratio at which the coefficient of friction is nearly maximum.

The embodiment of the invention illustrated in FIGS. 3, 4, and 5 also performs the second correction during the periods from $t_5$ to $t_6$ and from $t_8$ to $t_9$ when the pressure of the brake fluid is being decreased.

The invention may also be embodied as shown in FIG. 7. Here, the controller 10 differs from the controller 10 in FIG. 4. In the controller 10 of FIG. 7, the components 11. through 14 and 16 through 18 are identical to the like-numbered components in FIGS. 3 and 4. However, in the second correcting circuit 15 of FIG. 7, the base resistor $R_{14}$ of the transistor $Tr_{12}$ is connected to the collector of transistor $Tr_6$ of the driving amplifier 18. When the voltage Ec is generated between the time $t_5$ and $t_6$, a corresponding voltage, namely the inverse of the voltage Ecl is also applied to the transistor $Tr_{12}$ of the second correcting circuit 16. This causes the voltage Eg to be maintained at a value which is constant at a time shown by the dotted line in FIG. 6e. Consequently, the increase in the rate of the set gradient of the deceleration curve Vt is inhibited during the periods from $t_5$ to $t_6$ and from $t_8$ to $t_9$. Thus, the control of the wheel velocity Vw to be restored during the decrease of the pressure of the brake fluid and the deceleration curve Vt is accomplished more smoothly.

Figure 8:
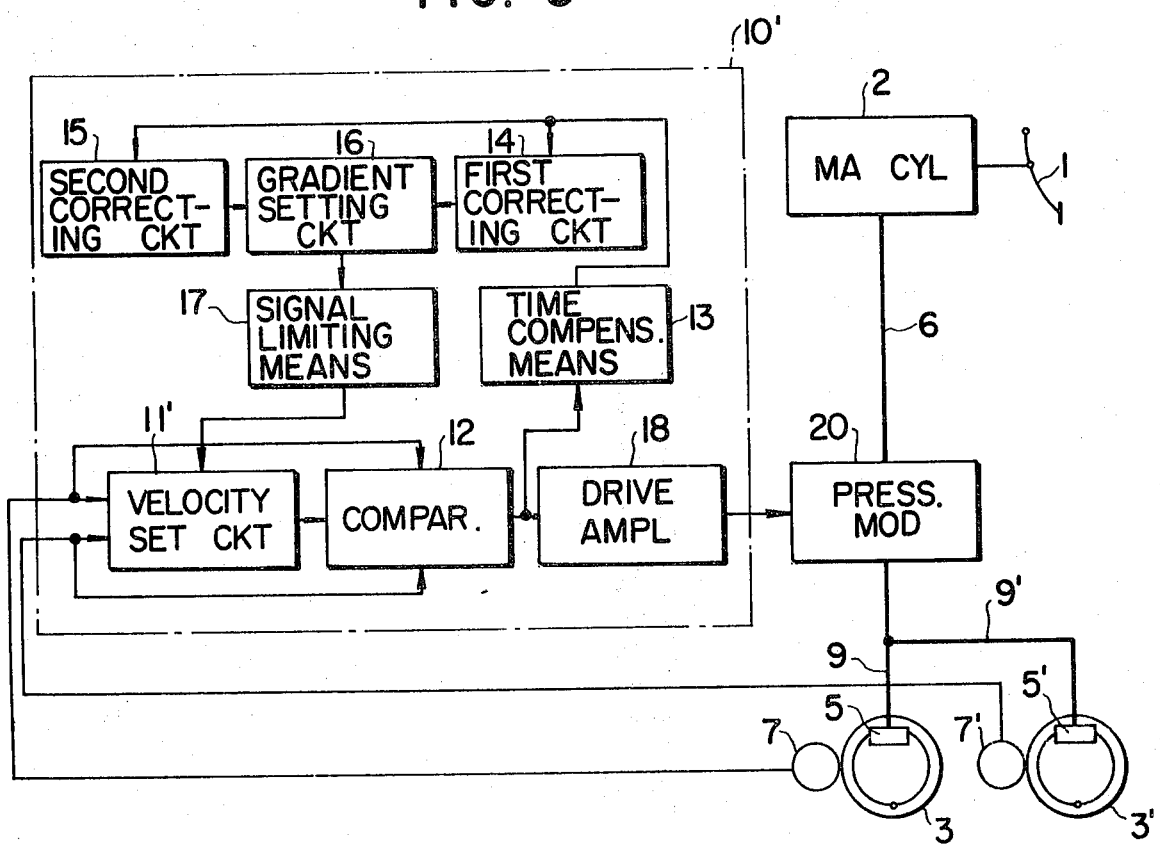
FIG. 8 is a block diagram illustrating still another embodiment of the antiskid apparatus of this invention.
Figure 9:
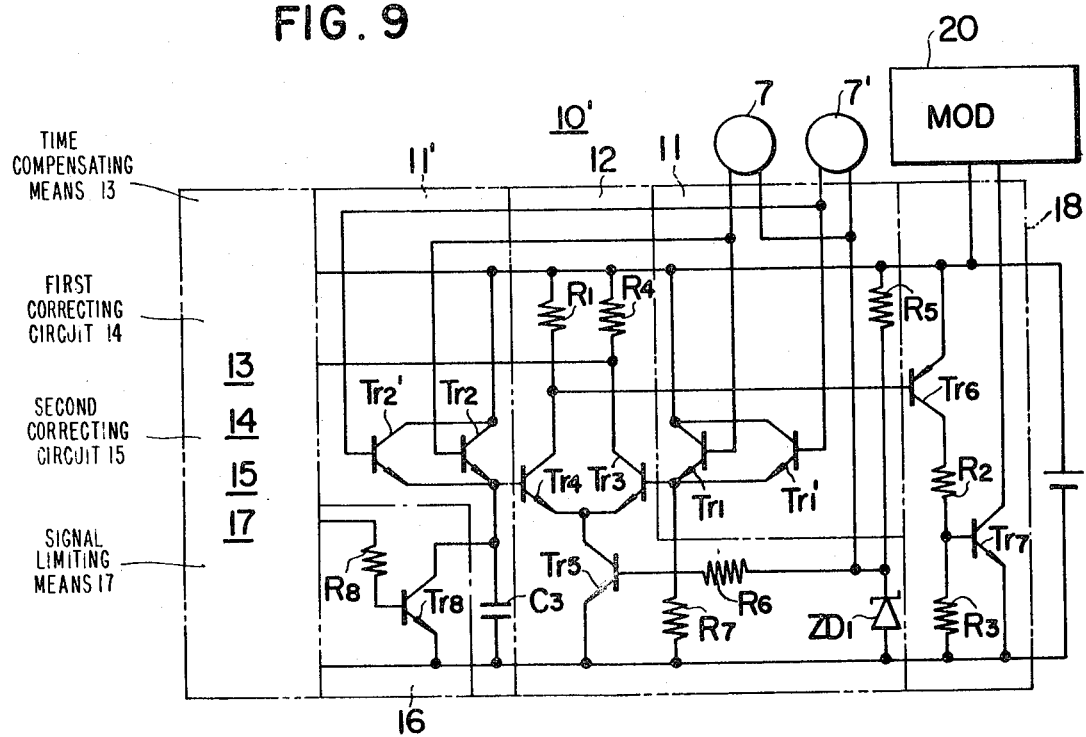
FIG. 9 is a schematic circuit diagram of a control system shown in FIG. 8.

According to another embodiment of the invention, the pressure of the brake fluid is modulated at a single point on the basis of a number of wheel velocities. Such an embodiment is illustrated in FIGS. 8 and 9. In FIG. 8, the pressure modulator 20 again appears in the oil passage line 6 between the master cylinder 2 and the wheel cylinder 5. However, here the pressure modulator affects a wheel 3' as well as the wheel 3. Therefore, a line 9 and a line 9' branch off between the pressure modulator 20 and a wheel cylinder 5' on the wheel 3'. According to one embodiment of the invention, the wheels 3 and 3' represent the rear wheels of an automobile.

Two wheel velocity detectors 7 and 7' are coupled to the two rear wheels 3 and 3' respectively. The two sensed wheel velocities are applied in parallel to the wheel velocity setting means 11 of the controller, here designated 10'. Thus, two rear wheels 3 and 3' are controlled so that the slip ratio at which the coefficient of friction is at a maximum can be obtained.

Details of the controller 10' appear in FIG. 9. Here, in the wheel velocity setting means or circuit, designated in FIG. 9 as 11', transistors $Tr_1'$ and $Tr_2'$ have paths of main current flow shunted across respective transistors $Tr_1$ and $Tr_2$. The wheel velocity detector 7 is connected to the bases of the transistors $Tr_1$ and $Tr_2$. The other wheel velocity detector is connected to the bases of the other pair of transistors $Tr_1'$ and $Tr_2'$. Other components and parts are constructed and utilized in the same manner as in FIG. 4.

By virtue of the construction in FIG. 9, a common deceleration curve is set by means of either of the wheel velocities in the controller 10'. The velocities of the left and right rear wheels are independently compared with the deceleration curve. This develops the pressure reducing or pressure applying signal. In this way, the pressures of the brake fluid in the rear wheels are changed to the same value by means of signals through the pressure modulator 20. Consequently, where the condition of the road surface, or the tire conditions, or other conditions are different for the left wheel and the right wheel and the deceleration or restoration of the velocity of the left wheel differs from that of the right wheel, the antiskid operation is performed on the basis of the information from the wheel which is likely to lock.

Figure 10:
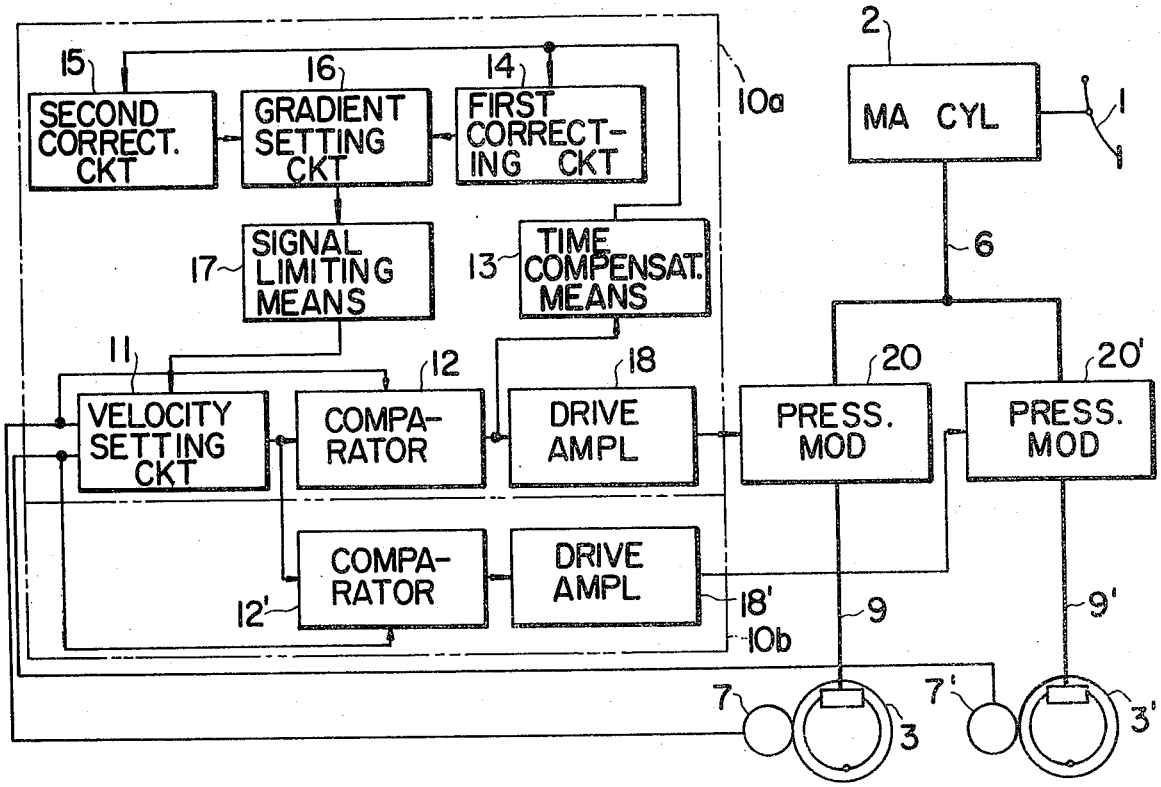
FIG. 10 is a block diagram illustrating still another antiskid apparatus embodying features of the invention.
Figure 11:
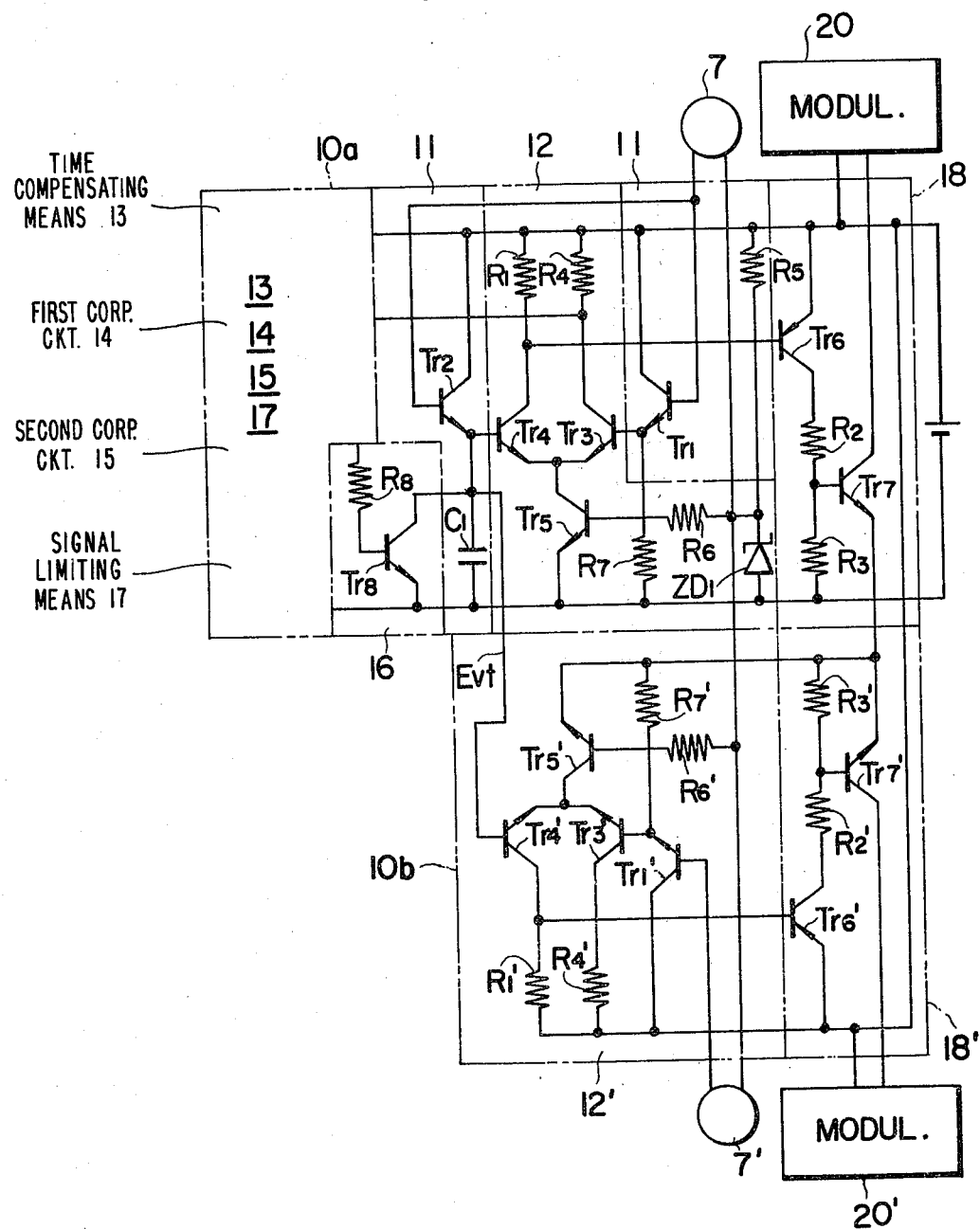
FIG. 11 is a schematic circuit diagram of the control system used in the embodiment of the invention shown in FIG. 10.

FIGS. 10 and 11 illustrate an embodiment of the invention wherein separate pressure modulators modulate the front and rear wheels on the basis of their responses to braking during an emergency. Such separate control is needed to overcome the effect of engine braking upon the drive wheels of a vehicle when the usual hydraulic brakes are applied to all wheels of the vehicle. Under these circumstances, the apparent wheel inertia is changed. Thus, it is desirable to perform an antiskid operation on the drive wheels during emergency braking independently from the operation on the driven wheels.

In FIGS. 10 and 11 like parts are designated with like numerals and duplicate parts with primed numerals. In FIG. 10, the pressure modulators 20 and 20' having the same construction as hereinbefore described control the oil pressure in the passages 6, 9, and 9' between the master cylinder 2, on the one hand, and the front wheel 3 and rear wheel 3' of the vehicle, on the other hand. Two separate controllers 10a and 10b control the front and rear wheels. The controller 10a corresponds to the controller 10' of FIG. 8. However, in FIG. 10, a comparator 12', identical to the comparator 12 and in a controller 10b, receives the output of the velocity setting circuit 11. The second input to the comparator 12' arrives from a wheel velocity detector 7' coupled to the rear wheel 3'. In the controller 10b a drive amplifier 18' corresponding to the drive amplifier 18 applies the output of the comparator 12' to the pressure modulator 20'. The remainder of the controller 10a corresponds to the controller 10'. The controller 10b utilizes the deceleration curve obtained by the correction circuits of the controller 10a. Thus, the same deceleration curve governs both pressure modulators.

FIG. 11 shows the controllers 10a and 10b in detail. Here the components 13, 14, 15, and 17 are identical to those of FIG. 4 and FIG. 9. Similarly, the components 11, 12, 16, and 18 correspond to those shown in FIGS. 4 and 9. The controller 10b coupled to the rear wheel includes the comparator 12' which is composed of transistors $Tr_3'$, $Tr_4'$, $Tr_5'$, and resistors $R_1'$, $R_4'$, $R_6'$, and $R_7'$. In the controller 10, the drive amplifier 19' is made up of transistors $Tr_6'$, $Tr_7'$, and resistors $R_2'$ and $R_3'$. The emitter of the transistor $Tr_2$ in the wheel velocity setting means 11 of the controller 10a coupled to the front wheel is connected to the base of the transistor $Tr_4'$ of the comparator 12'. That is to say, the base of the transistor $Tr_4'$ is connected to receive the voltage appearing in the emitter of transistor $Tr_2$ and across the capacitor $C_1$. Therefore, the base of the transistor $Tr_4'$ responds to the corrected deceleration curve.

The wheel velocity detector 7' coupled to the rear wheel drives the base of the transistor $Tr_3'$ through the transistor $Tr_1$. This allows the comparator 12 to perform its comparison of the deceleration curve of the wheel velocity. The collector of a transistor $Tr_7'$ in the drive amplifier 18' responds to the output of the comparator 12', through the transistor $Tr_6'$, to actuate the pressure modulator 20'. The latter modulates the pressure of the brake fluid in the brake cylinder of the rear wheel 3'. The components in controller 10b operate in the same manner as their unprimed like-numbered components.

The above construction controls the antiskid operation of the front wheel by means of the wheel velocity detector 7, controller 10a and pressure modulator 20. On the other hand, antiskid control of the rear wheel, during rapid or emergency braking of the vehicle, is performed independently of the front wheel by means of the wheel velocity detector 7', an auxiliary controller 10b utilizing the deceleration curve established for the front wheel where the wheel inertia does not change, and another pressure modulator 20'.

The invention, of course, may be used in a four-wheel vehicle by connecting the line 9 to the wheel cylinders of both front wheels, and controlling the pressure in the wheel cylinders of the two rear wheels through the line 9'. In this case, the wheel 3 represents the one of the two front wheels to which the detector 7 is coupled and the wheel 3' represents the one of the two rear wheels to which the detector 7' is coupled.

Figure 12:
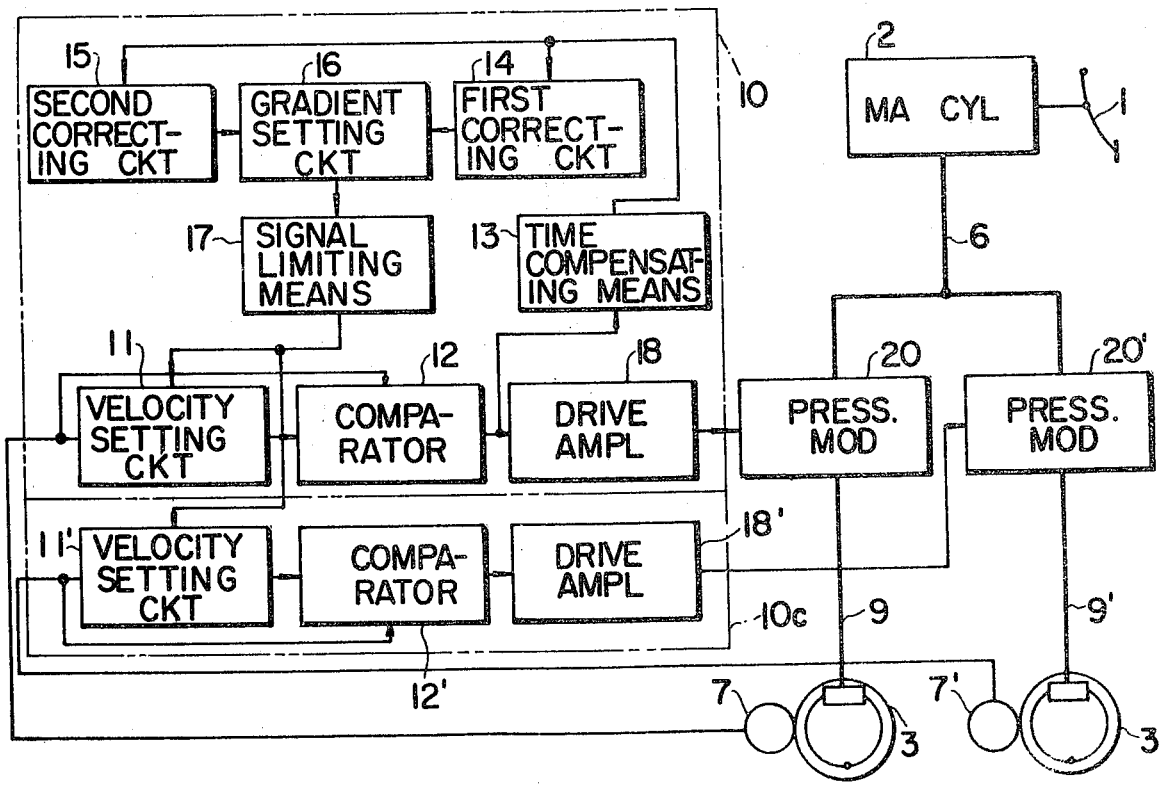
FIG. 12 is a block diagram illustrating still another antiskid apparatus embodying features of the invention.
Figure 13:
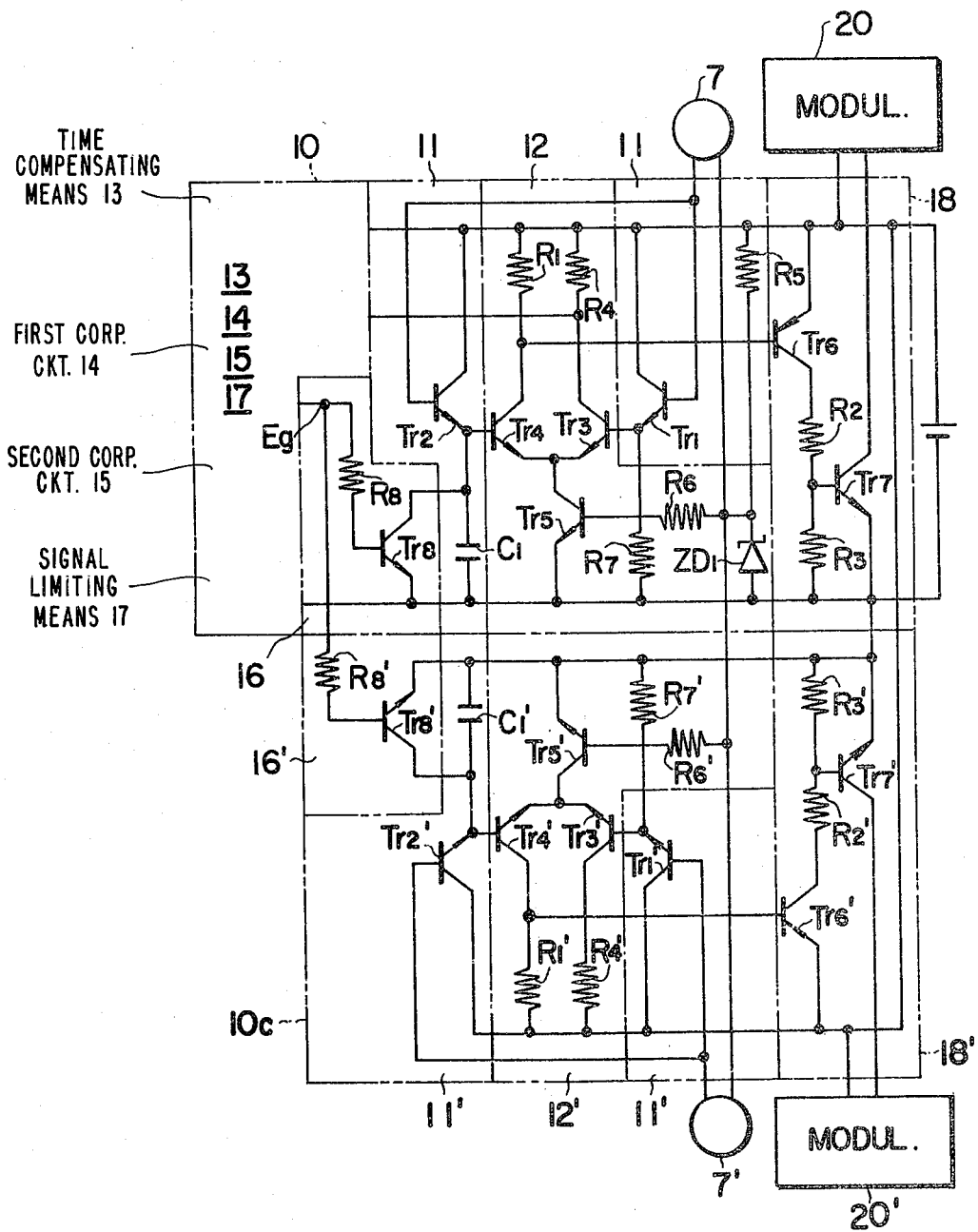
FIG. 13 is a circuit diagram of the control system of the embodiment shown in FIG. 12.

FIGS. 12 and 13 illustrate still another embodiment of the invention. In FIG. 12 the controller 10c differs from the controller 10b in furnishing a second velocity setting circuit 11' which responds to the velocity of the rear wheel to which the velocity detector 7' is connected. The controller 10 of FIG. 12 corresponds substantially to the controller 10 of FIG. 4. In effect, the components 11' and 12' and 18' constitute duplicates of the components 11, 12, and 18 in the controller 10. The velocity setting circuit 11' obtains one of its inputs, as stated, from the generator 7' and its second input from the output of the signal limiting means 17 of the controller 10. Otherwise the arrangement of FIG. 12 corresponds to that of FIG. 10. In effect, the controller 10c utilizes the correcting operation, gradient setting operation, time compensating operation and limiting operation of the controller 10 as one of its inputs.

Details of the circuit in FIG. 12 appear in FIG. 13. Here the controller 10 operates substantially as the controller 10 of FIG. 4. In the controller 10c the specific transistors are duplicates of the correspondingly numbered but unprimed transistors in the controller 10. The controller 10c associated with the rear wheel or rear wheels includes the transistors $Tr_1'$ and $Tr_2'$ as part of the wheel velocity setting means 11'. The transistor $Tr_2'$ is connected to the wheel velocity detector 7' coupled to a rear wheel 3'.

A capacitor $C_1'$ corresponds to the capacitor $C_1$. The comparator 12' is composed of the three transistors $Tr_3'$, $Tr_4'$ and $Tr_5'$ as well as the resistors $R_1'$, $R_4'$, $R_6'$, and $R_7'$. The comparator 12 compares the set deceleration curve with the velocity of the measured rear wheel. The drive amplifier 18' is composed of transistors $Tr_6'$ and $Tr_7'$ and resistors $R_2'$ and $R_3'$ and is adapted to be connected to the pressure modulator 20'. The latter controls the pressure to the wheel 3'. According to an embodiment of the invention, the pressure modulator 20' controls the pressure to both rear wheels of the four-wheeled vehicle while the detector 7' detects the velocity of one of the wheels. The modulator 20 then controls both front wheels.

A transistor $Tr_8'$ shunted across the capacitor $C_1'$, and the resistor $R_8'$ form part of the gradient setting means. The resistor $R_8'$ receives its input Eg from the same source as the resistor $R_8$ in the controller 10 associated with the front wheels. The controller 10c sets the gradient of the deceleration curve for the rear wheels on the basis of the correction, limitation and time compensation obtained from the controller 10 associated with the front wheels. The components of FIG. 13 perform their function in the same way as the components of FIGS. 4, 9, and 11.

By virtue of the above described construction antiskid control of the front wheel or wheels 3 during emergency braking is accomplished separately from that of the rear wheel or wheels 3'. Thus, stable control can be obtained without the influence by the changes of the wheel inertia.

In the embodiments of FIGS. 8 and 9, 10 and 11, and 12 and 13, the drive wheel or wheels are the rear wheels. However, according to another embodiment of the invention, the drive wheels are in the front of a front drive vehicle and the desired effects are obtained by reversing the antiskid control for the front and rear wheels.

As described above, the antiskid apparatus embodying features of this invention regulates the pressure of brake fluid during rapid or emergency braking by means of the wheel velocity detector 7, pressure modulator 20 and controller 10. The latter is composed of a wheel velocity setting means 7, comparator 12, time compensating means 13, first correcting circuit 14, second correcting circuit 15, gradient setting circuit 16, gradient signal limiting means 17, and drive amplifier 18. Braking is performed at the slip ratio at which the coefficient of friction is, on the average, maximum.

When regulating the pressure of the brake fluid, the deceleration curve to be set for comparison with the wheel velocity is corrected so as to decrease or increase continuously in accordance with the braking conditions or to stop the rate of increase during an increase. Therefore, optimum control is achieved by obtaining the deceleration curve conforming to the condition of the road surface.

According to another embodiment of the invention, where a plurality of front and rear wheels are controlled by wheel cylinders, and the pressure of the brake fluid is regulated, the left and right drive wheels and the left and right driven wheels, or at least two drive wheels and two driven wheels, are selected and independent antiskid control is applied separately on the basis of the respective wheel velocities. This is accomplished by taking the embodiment of the invention illustrated in FIGS. 3 and 4 and applying four of these structures, one to each of the four wheels of the vehicle. The master cylinder 2 is common to all of the structures and connected to each of the separate antiskid controls by branches of the line 6. In this way the antiskid operation is stable over the entire vehicle without being influenced by changes in the wheel inertia.

The controller 10b and the controller 10c can be used for antiskid control of drive wheels by utilizing the signal of the deceleration curve or gradient setting signal of the deceleration curve which is used for antiskid operation of the driven wheels. Consequently, the construction is simplified by eliminating overlapping portions. Various other eliminations of controls and wheels are also possible.

Instead of using electrical circuits in the embodiments of the invention described above, the antiskid apparatus may comprise mechanical, oil hydraulic, or air pressure elements. For example, in employing mechanical elements, the capacitor $C_1$ may be replaced by a flywheel, the discharging transistor $Tr_8$ by a friction brake adapted to accelerate the flywheel, the charging capacitor $Tr_2$ by a one-way clutch adapted to accelerate the flywheel, the differential amplifier by a governor mechanism, etc.

Figure 14:
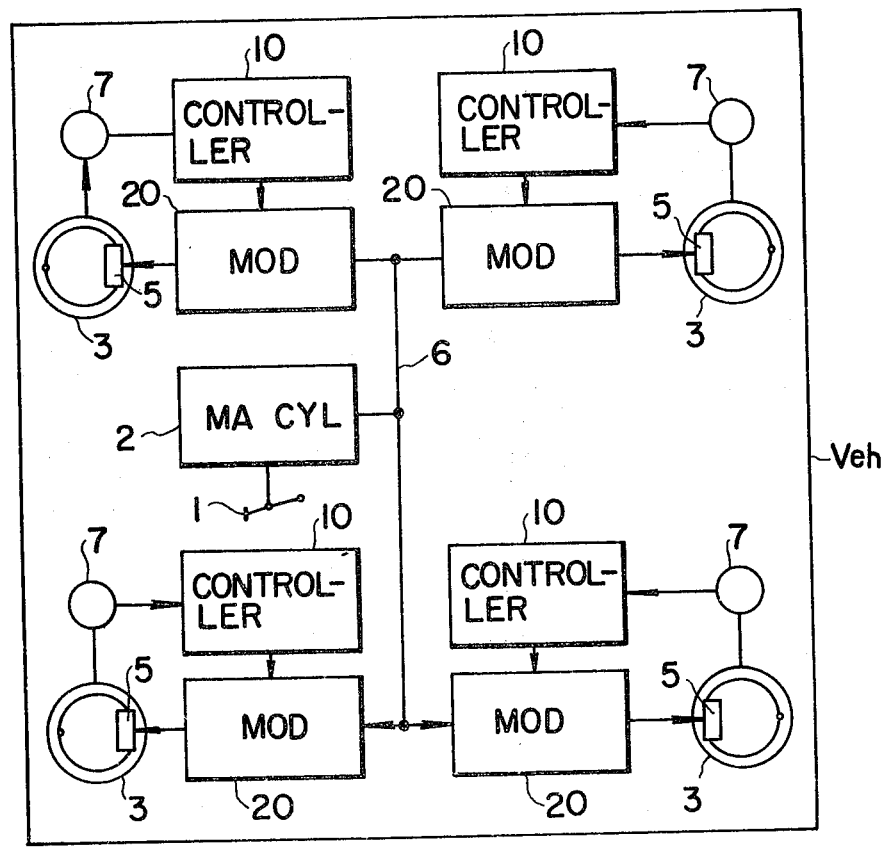
FIGS. 14, 15, and 16 are block diagrams of vehicles incorporating the embodiments of the invention illustrated in FIGS. 3 and 4, 8 and 9, and 10 to 13, respectively.

FIG. 14 illustrates the beforementioned embodiment of the invention wherein, in a vehicle Veh, a single master cylinder 2 applies pressure to the brake cylinders 5 of four wheels 3 through four systems each composed of the components of FIGS. 3 and 4 (except for the brake pedal 1 and the master cylinder 2). The pressure from the master cylinder passes through, and is modulated by, four modulators 20 each operating as in FIGS. 3 and 4. Four separate controllers 10 actuate the modulator in response to four respective generators 7 each coupled to a wheel 3. Each component corresponds to the like-numbered component in FIGS. 3 and 4.

Figure 15:
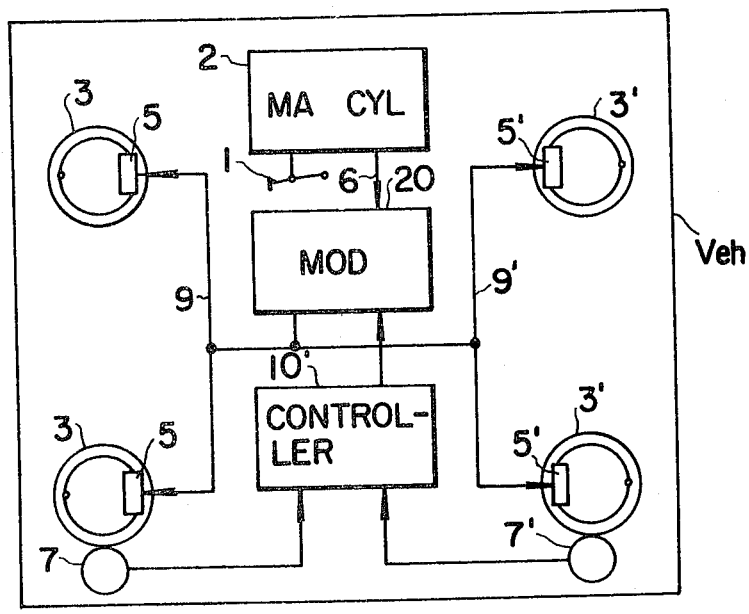

FIG. 15 illustrates the system of FIGS. 8 and 9 in the vehicle Veh.

Figure 16:
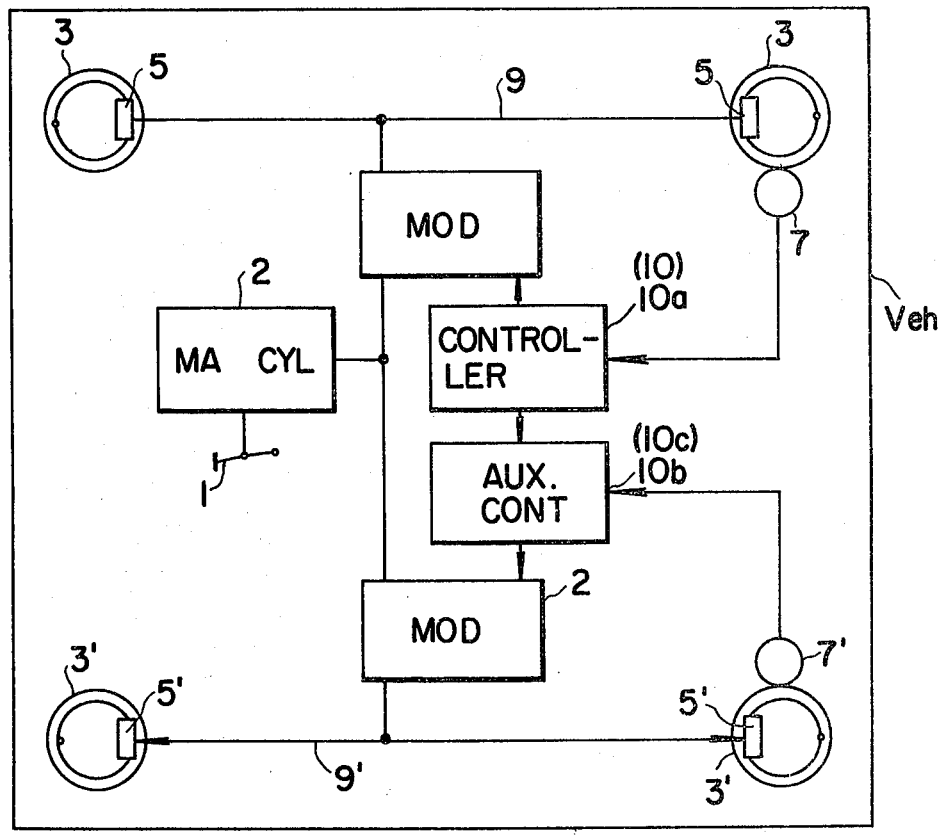

FIG. 16 illustrates the system of FIGS. 10 and 11 in the vehicle Veh. With the controller 10a and auxilliary controller 10c, FIG. 16 illustrates the system of FIGS. 12 and 13.

The invention is based on the fact that in increasing the pressure of braking fluid linearly the deceleration of the wheel suddenly increases and the wheel velocity rapidly decreases when the wheel slip ratio exceeds the point where the coefficient of friction is maximum. Thus, it is possible to provide optimum control by obtaining the slip ratio, at which the coefficient of friction is at a maximum, from the deceleration of the wheel velocity.

While embodiments of the invention have been described in detail it will be obvious to those skilled in the art that the invention may be embodied otherwise.

What is claimed is:

1. A skid control system for a vehicle having a wheel and a brake system for slowing the vehicle, comprising wheel velocity detecting means coupled to the wheel, control means responsive to said detecting means for initiating a signal when said detecting means indicates that the wheel velocity decreases faster than a given rate of velocity decrease and for maintaining the signal while the wheel velocity is less than the velocity corresponding to the given rate of decrease, brake modulating means coupled to said control means for reducing the braking effect of the system on the wheel in response to the signal and cancelling the reduction of the braking effectiveness in the absence of the signal, variable gradient establishing means coupled to said control means for continuously only steepening the given rate of decrease over a time period toward a maximum rate of decrease in response to the absence of the signal and for continuously lessening the given rate of decrease over a time period during the signal, time delay means coupled to said gradient establishing means for delaying the lessening of the given rate of decrease and continuing the steepening of the given rate of decrease for a given time after onset of the signal.

2. A system as in claim 1, further comprising second wheel velocity detecting means coupled to another wheel of the vehicle, said control means being responsive to said second detecting means and initiating a signal when either of said detecting means indicates that a wheel velocity decreases faster than the given rate of decrease.

3. A system as in claim 1, for a vehicle having another wheel responsive to the brake system, further comprising second wheel velocity detecting means coupled to the wheel, said control means forming an electrical indication corresponding to the given rate of decrease as the given rate of decrease varies, said control means including auxiliary means responsive to the electrical indication and said wheel velocity detecting means for producing a second signal when said second wheel velocity detecting means indicates that the second wheel decelerates faster than the given rate of decrease and for maintaining the signal while the wheel velocity of the second wheel is less than the velocity corresponding to the given rate of decrease, second brake modulating means coupled to said auxiliary means for reducing the braking effectiveness of the system on the second wheel in response to the second signal and cancelling the reduction in the absence of the second signal.

4. A skid control system as in claim 1 for a vehicle having a second wheel responsive to the brake system, further comprising second wheel velocity detecting means coupled to the second wheel, said control means including auxiliary means responsive to said variable gradient establishing means and responsive to said second detecting means for initiating the signal when the second detecting means indicates that the second wheel velocity decreases faster than a given rate of decrease and for maintaining the signal when the velocity is less than a velocity corresponding to the given rate of decrease, and second brake modulating means coupled to said auxiliary means for reducing the braking effectiveness of the system on the second wheel in response to the second signal and cancelling the reduction in the absence of the signal.

5. A system as in claim 1, wherein said control means includes gradient setting means responsive to said variable gradient establishing means to set the given rate in response to said variable gradient establishing means.

6. A system as in claim 5, wherein said variable gradient establishing means includes a gradient setting circuit for varying the given rate of decrease, first correcting means for constraining said gradient setting circuit to steepen the rate of decrease in response to absence of the signal, and second correcting means for lessening the rate of decrease in response to the signal, and signal limiting means responsive to said gradient setting circuit for limiting the variation in the given rate of decrease.

7. A system as in claim 6, further comprising second wheel velocity detecting means coupled to another wheel of the vehicle, said control means being responsive to said second detecting means and initiating a signal when either of said detecting means indicates that a wheel velocity decreases faster than the given rate of decrease.

8. A system as in claim 6, for a vehicle having another wheel responsive to the brake system, further comprising second wheel velocity detecting means coupled to the wheel, said control means forming an electrical indication corresponding to the given rate of decrease as the given rate of decrease varies, said control means including auxiliary means responsive to the electrical indication and said second wheel velocity detecting means for producing a second signal when said second wheel decelerates faster than the given rate of decrease and for maintaining the signal while the wheel velocity of the second wheel is less than the velocity corresponding to the given rate of decrease, second brake modulating means coupled to said auxiliary means for reducing the braking effectiveness of the system on the second wheel in response to the second signal and cancelling the reduction in the absence of the second signal, said control means including a velocity setting circuit responsive to said signal limiting means, said auxiliary means being responsive to said velocity setting circuit.

9. A system as in claim 6 for a vehicle having a second wheel responsive to the brake system, further comprising second wheel velocity detecting means coupled to the second wheel, said control means including auxiliary means responsive to said variable gradient establishing means and responsive to said second detecting means for initiating the signal when the second detecting means indicates that the second wheel velocity decreases faster than a given rate of decrease and for maintaining the signal when the velocity is less than a velocity corresponding to the given rate of decrease, and second brake modulating means coupled to said auxiliary means for reducing the braking effectiveness of the system on the second wheel in response to the second signal and cancelling the reduction in the absence of the signal, said control means including a velocity setting circuit responsive to said signal limiting means, said auxiliary means including an auxiliary velocity setting circuit, said auxiliary velocity setting circuit being responsive to said signal limiting means and said second vehicle velocity detecting means.

10. A system as in claim 1, wherein said brake modulating means includes means for decreasing the braking effectiveness substantially linearly.

11. A system as in claim 1, wherein said control means includes capacitor means for receiving the output of said detecting means, and comparing means for comparing whether the voltage at said capacitor means follows the output of said detecting means, and for producing the signal when the voltage across said capacitor means fails to follow the output of said detecting means.

12. A system as in claim 11, wherein said gradient establishing means includes resistive means forming a time constant with said capacitor means for varying the rate at which the voltage across said capacitor means can follow the output of said detecting means.

13. A system as in claim 12, wherein said gradient establishing means includes time-variable correcting means for urging said resistive means to steepen the given rate of decrease towards the maximum rate.

14. A system as in claim 13, wherein said time-variable correcting means include a capacitor and means for discharging said capacitor.

15. A system as in claim 13, wherein said variable gradient establishing means includes second correcting means responsive to said time delay means for reversing the rate of change of the output of said first correcting means so as to constrain said resistive means to lessen the given rate of decrease.

16. A system as in claim 15, wherein said first correcting means includes a capacitor which is discharged to steepen the given rate of decrease and wherein said second correcting means charges said capacitor.

17. A system as in claim 15, wherein said first and second correcting means form a voltage output to said resistive means for controlling said resistive means, and wherein clipping means coupled to the voltage output establish the maximum rate of decrease and a minimum rate of decrease.

18. An apparatus as in claim 17, wherein said time delay means includes a resistor-capacitor circuit.

19. A system as in claim 13, wherein said time delay means include a resistor-capacitor circuit.

20. An apparatus as in claim 1, wherein said variable gradient establishing means continuously steepens and lessens the rate of decrease between the maximum and a minimum, and wherein variable gradient establishing means includes regulating means for regulating the rapidity at which the rate of decrease is varied continuously so that the time between the maximum and minimum rate exceeds the given time of delay in said delay means.

21. An apparatus as in claim 20, wherein said regulating means includes an energy storage device, and wherein said variable gradient establishing means further includes first switch means responsive to said delay means and the signal for changing the energy stored in said energy storage means in one direction so that said energy storage means produces an output which steepens the rate of decrease and second switch means for changing the energy in said energy storage means in the other direction so that said energy storage means lessens the given rate of decrease.

22. An apparatus as in claim 21, wherein said energy storage means is a capacitor and said first and second switch means are respective transistors.

23. For a vehicle having a wheel and a brake system coupled to the wheel for slowing the vehicle, a skid control system, comprising a wheel velocity detector coupled to the wheel, reference velocity establishing means coupled to said detector for establishing a reference velocity descending at a given rate, comparator means coupled to said detector and said establishing means for initiating and maintaining a first signal when the wheel velocity has less than a predetermined relationship with the reference velocity and a second signal at other times, brake modulating means coupled to the comparator for reducing the braking effect in response to the first signal, said comparator means effecting a transition from the first signal to the second signal on the basis of the wheel velocity and the rate in said establishing means, gradient varying means coupled to said establishing means and said comparator means for increasing the rate during the second signal and changing the rate during the first signal always to a rate less at the end of the first signal than the rate at the start of the first signal and changing the time of transition effected by the comparator means from the second signal to the first signal.

24. An apparatus as in claim 23, wherein said gradient varying means changes the rate during the first signal continuously over an infinite number of rates which can vary only between a maximum rate and a minimum rate.

25. An apparatus as in claim 23, wherein said gradient varying means includes delay means for delaying the change to the lesser rate for a given time after the onset of the first signal.

26. An apparatus as in claim 25, wherein said gradient varying means changes the rate during the first signal continuously over an infinite number of rates which can vary only between a maximum rate and a minimum rate.

27. An apparatus as in claim 23, wherein said gradient varying means includes an energy storage device for producing a physical value controlling the rate, said gradient varying means further including first correcting means responsive to the first signal and coupled to said energy storage device for changing the energy stored in said energy storage means in one direction so that said energy storage means produces a physical value which lessens the rate and second correcting means and coupled to said energy storage device for changing the energy in said energy storage means in the other direction so energy storage means increases the rate in response to the second signal.

28. An apparatus as in claim 27, wherein said gradient varying means changes the rate during the first signal continuously over an infinite number of rates which can vary only between a maximum rate and a minimum rate.

29. An apparatus as in claim 27, wherein said gradient varying means includes delay means for delaying the change to the lesser rate for a given time after the onset of the first signal, said first correcting means being responsive to said delay means so as to change the energy stored only after the delay time.

30. An apparatus as in claim 29, wherein said gradient varying means changes the rate during the first signal continuously over an infinite number of rates which can vary only between a maximum rate and a minimum rate.

31. An apparatus as in claim 30, wherein said energy storage means is a capacitor, said first correcting means including a transistor having a path of main current flow for charging the capacitor in response to the first signal and said delay means, said second correcting means including a transistor having a path of main current flow connected across said capacitor and responding to said second signal for discharging said capacitor during said second signal, each of said first and second correcting means including diode means for limiting the operation of said transistors beyond maximum and minimum physical values for changing the rates.

32. An apparatus as in claim 31, wherein said comparator means includes a two-transistor emitter-coupled differential circuit, each of said transistors in said differential circuit being coupled to said wheel velocity detector, one of said transistors having a base with a reference capacitor connected thereto for establishing the reference velocity, a transistor controlled by said storage means capacitor and coupled across said reference capacitor for varying the discharge rate of the second capacitor.

* * * * *